US010495234B2

(12) United States Patent
Fagerlund et al.

(10) Patent No.: US 10,495,234 B2
(45) Date of Patent: Dec. 3, 2019

(54) FLOW STABILIZER FOR A CONTROL VALVE

(71) Applicant: FISHER CONTROLS INTERNATIONAL LLC, Marshalltown, IA (US)

(72) Inventors: Allen C. Fagerlund, Marshalltown, IA (US); Daniel J. Eilers, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 128 days.

(21) Appl. No.: 15/717,833

(22) Filed: Sep. 27, 2017

(65) Prior Publication Data
US 2019/0093791 A1    Mar. 28, 2019

(51) Int. Cl.
F16K 5/00 (2006.01)
F16K 47/08 (2006.01)
F16K 5/12 (2006.01)
F15D 1/00 (2006.01)
F16L 55/027 (2006.01)
F16L 55/033 (2006.01)
F16K 5/06 (2006.01)

(52) U.S. Cl.
CPC .............. F16K 47/08 (2013.01); F15D 1/001 (2013.01); F16K 5/12 (2013.01); F16L 55/027 (2013.01); F16L 55/033 (2013.01); F16K 5/06 (2013.01)

(58) Field of Classification Search
CPC .......... F16K 47/08; F16K 47/12; F16K 47/16; F16L 55/02763
See application file for complete search history.

(56) References Cited

U.S. PATENT DOCUMENTS 2,708,006 A * 5/1955 Backman .................. F01N 1/18
                                                       181/225
3,170,483 A   2/1965 Milroy
3,374,832 A   3/1968 Tucker
3,630,229 A   12/1971 Nagel et al.
(Continued)

FOREIGN PATENT DOCUMENTS

DE    2020015 A1    1/1972
DE    2410231 A1    9/1975
(Continued)

OTHER PUBLICATIONS

International Search Report and Written Opinion, corresponding International Application No. PCT/US2018/050412, dated Dec. 10, 2018.

Primary Examiner — Reinaldo Sanchez-Medina
(74) Attorney, Agent, or Firm — Marshall, Gerstein & Borun LLP

(57) ABSTRACT

A flow stabilizer adapted to be disposed in an outlet passage of a rotary valve includes a main body having an axis, a first end, and a second end. A first shell is disposed at least partially within the main body, and the first shell includes an axis, a first end, and a second end. A second shell is disposed at least partially within the main body and at least partially within the first shell, and the second shell includes an axis, a first end, and a second end. The axis of the first shell is angled relative to the axis of the main body and the axis of the second shell is angled relative to axis of the main body.

20 Claims, 7 Drawing Sheets

(56) References Cited

U.S. PATENT DOCUMENTS

| | | | |
|---|---|---|---|
| 3,665,965 A | 5/1972 | Baumann | |
| 4,000,878 A | 1/1977 | Vick | |
| 4,007,908 A | 2/1977 | Smagghe et al. | |
| 4,008,737 A | 2/1977 | Kluczynski et al. | |
| 4,050,479 A | 9/1977 | Baumann | |
| 4,058,141 A | 11/1977 | Hasinger et al. | |
| 4,085,774 A * | 4/1978 | Baumann | F16K 3/34 |
| | | | 137/625.3 |
| 4,180,100 A | 12/1979 | Kolb et al. | |
| 4,271,866 A * | 6/1981 | Bey | F16K 5/0605 |
| | | | 137/625.3 |
| 4,402,485 A | 9/1983 | Fagerlund | |
| 4,474,259 A | 10/1984 | Wright | |
| 5,307,830 A * | 5/1994 | Welker | F16K 47/08 |
| | | | 137/1 |
| 5,480,123 A * | 1/1996 | Bey | F16K 1/22 |
| | | | 251/127 |
| 5,772,178 A * | 6/1998 | Bey | F16K 47/045 |
| | | | 138/42 |
| 5,988,586 A * | 11/1999 | Boger | F16K 47/08 |
| | | | 138/42 |
| 6,024,125 A * | 2/2000 | Baumann | F16K 1/24 |
| | | | 137/625.32 |
| 6,807,986 B2 * | 10/2004 | Boger | F16K 47/08 |
| | | | 138/44 |
| 8,556,226 B2 * | 10/2013 | Song | F16K 47/045 |
| | | | 137/625.3 |
| 2009/0184277 A1 | 7/2009 | Song | |
| 2012/0319025 A1 * | 12/2012 | Shu | F16K 47/04 |
| | | | 251/328 |

FOREIGN PATENT DOCUMENTS

| | | |
|---|---|---|
| FR | 2507299 A1 | 12/1982 |
| JP | S6044673 A | 3/1985 |
| WO | WO-82/04470 A1 | 12/1982 |

* cited by examiner

B-B

C-C

FLOW STABILIZER FOR A CONTROL VALVE

TECHNICAL FIELD

This disclosure relates generally to a control valve, and specifically, to a flow stabilizer for a control valve.

BACKGROUND

A control valve may incorporate a device to break up a fluid stream into a plurality of flow paths to reduce noise resulting from the flowing fluid. These devices, known as fluid resistant devices, noise attenuators, or flow stabilizers, may be used to reduce high static-pressure of liquid or gas flow, preferably without the undesirable by-products of a high aerodynamic noise level (in the case of a compressible fluid, such as gas), or cavitation and erosion (in case of a liquid). Such devices may include spaced apart perforated plates, tubes, and braces. Some of these existing devices may suffer from one or more deficiencies, and thus further improvements in those devices may be desired.

SUMMARY

In accordance with a first exemplary aspect of the present disclosure, a control valve may include a valve body including a generally axial fluid flow path extending from an upstream face surface to a downstream face surface of the valve body. The valve body may include a chamber and a control member disposed within the chamber to control fluid flow through the valve body. A flow stabilizer may be disposed adjacent to the downstream face surface of the valve body. The flow stabilizer may include a plurality of nested shells including an outer shell having an axis, a first end, and a second end. The flow stabilizer may include a first inner shell disposed at least partially within the outer shell. The first inner shell include an axis, a first end, and a second end. The axis of the first inner shell may be angled relative to the axis of the outer shell.

In accordance with a second exemplary aspect of the present disclosure, a flow stabilizer adapted to be disposed in an outlet passage of a rotary valve may include a main body or outer shell including an axis, a first end, and a second end. A first shell may be disposed at least partially within the main body, and the first shell may include an axis, a first end, and a second end. The axis of the first shell may not be parallel to the axis of the main body.

In accordance with a third exemplary aspect of the present disclosure, a flow stabilizer adapted to be disposed in an outlet passage of a valve may include a main body having an axis, a first end, and a second end. A first shell may be disposed at least partially within the main body, the first shell may include an axis, a first end, and a second end. A second shell may be disposed at least partially within the main body and at least partially within the first shell, the second shell may include an axis, a first end, and a second end. Further, a first brace may be integrally formed with the main body and the first shell, and a second brace may be integrally formed with the first shell and the second shell. A cross-sectional shape of the first shell may be circular from the first end of the first shell to the second end of the first shell, and a cross-sectional shape of the second shell may be circular from the first end of the second shell to the second end of the second shell.

In further accordance with any one or more of the foregoing first, second, and third exemplary aspects, a control valve and/or a flow stabilizer may include any one or more of the following preferred forms.

In one preferred form, a second inner shell may be disposed at least partially within the main body and at least partially within the first inner shell. The second inner shell may include an axis, a first end, and a second end. The axis of the second inner shell may not be parallel to the axis of the main body.

In one preferred form, a third inner shell may be disposed at least partially within the main body and at least partially within the second inner shell. The third shell may include an axis, a first end, and a second end. The axis of the third inner shell may be angled (i.e., not parallel) relative to the axis of the main body.

In another preferred form, the main body may have a cylindrical internal surface that defines a main body interior portion. The first shell, the second shell, and the third shell may be disposed at least partially within the interior portion of the main body.

In another preferred form, a cross-sectional shape of the first shell may be circular from the first end of the first shell to the second end of the first shell, and a cross-sectional shape of the second shell may be circular from the first end of the second shell to the second end of the second shell.

In another preferred form, the first shell and the second shell may define at least one linear flow path, and wherein the at least one linear flow path slopes relative to the axis of the main body from a lower inner surface of the main body toward an upper inner surface of the main body.

In another preferred form, the first shell and the second shell may define at least one curved flow path, and wherein the at least one curved flow path slopes relative to the axis of the main body from a lower inner surface of the main body toward an upper inner surface of the main body.

In another preferred form, a plurality of flow paths may extend between the first end of the main body and the second end of the main body.

In another preferred form, a first flow path of the plurality of flow paths may be at least partially defined by the main body and the first shell, and a second flow path of the plurality of flow paths may be at least partially defined by the first shell and the second shell.

In another preferred form, a plurality of braces may separate the plurality of flow paths, wherein a first brace of the plurality of braces may connect the main body and the first shell and a second brace of the plurality of braces may connect the first shell and the second shell. The plurality of braces may extend between the first end of the main body and the second end of the main body.

In another preferred form, at least one of the plurality of braces may be perforated.

In another preferred form, the first shell may include a plurality of apertures, wherein the apertures fluidly connecting an inner surface of the first shell and an outer surface of the first shell.

In another preferred form, the first shell and the second shell may be concentrically aligned at the first end of each of the first shell and second shell. The first shell and second shell may be eccentrically aligned at the second end of each of the first shell and second shell.

In another preferred form, the axis of the first shell may be angled (i.e., not parallel) relative to the axis of the main body, and the axis of the second shell may be angled (i.e., not parallel) relative to the axis of the main body and the axis of the first shell.

In another preferred form, the first brace and the second brace may be parallel.

In another preferred form, the first brace and the second brace may be non-parallel.

In another preferred form, a second inner shell may be disposed at least partially within the outer shell and at least partially within the first inner shell. The second inner shell may have an axis, a first end, and a second end. The axis of the second inner shell may be angled relative to the axis of the outer shell.

In another preferred form, a third inner shell may be disposed at least partially within the outer shell and at least partially within the second inner shell. The third inner shell may have an axis, a first end, and a second end. The axis of the third inner shell may be angled relative to the axis of the outer shell.

In another preferred form, the outer shell may include a tailpiece.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several Figures, in which:

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
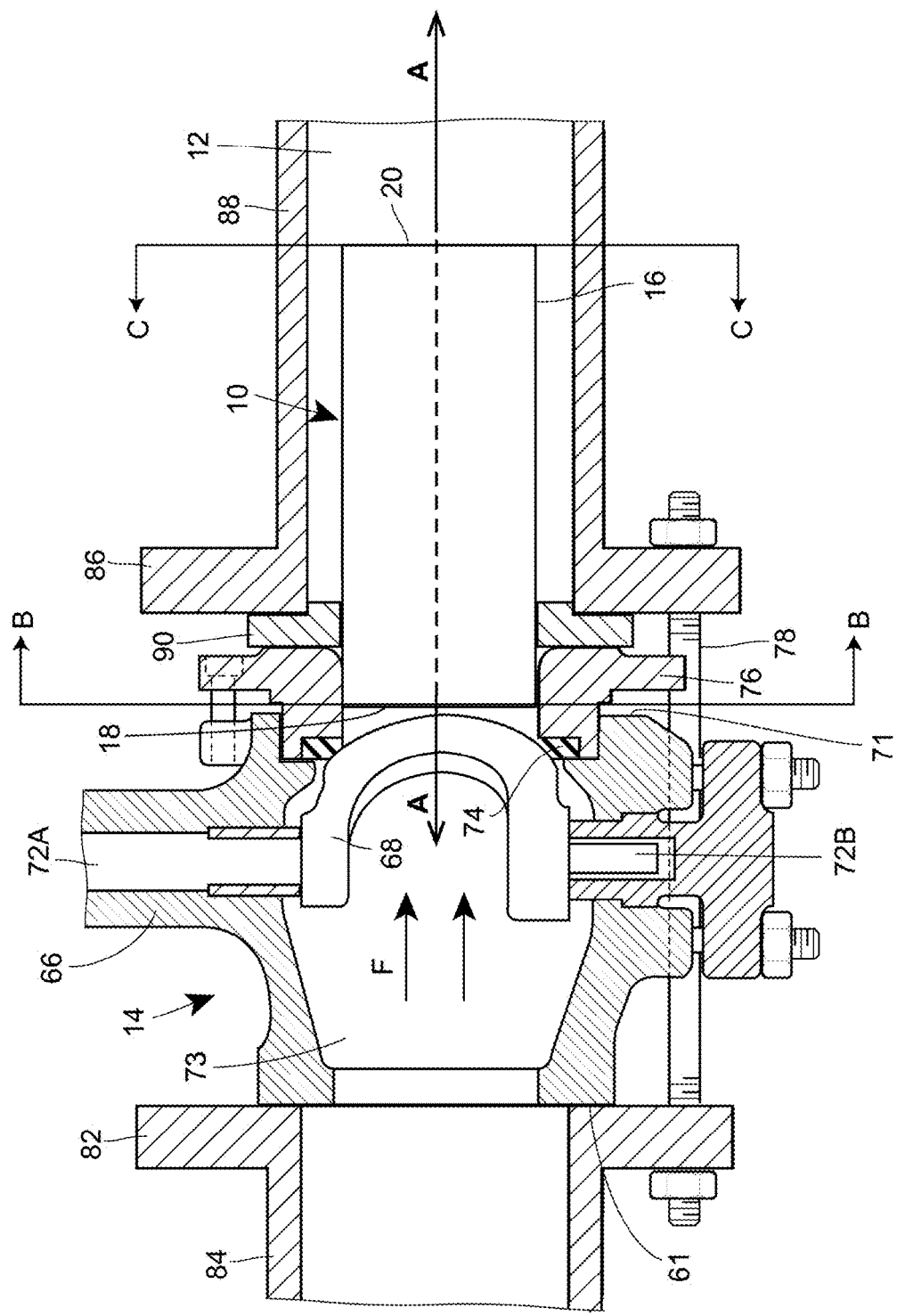
FIG. 1 is a cross-sectional view of a control valve employing a first example of a flow stabilizer constructed according to the teachings of the present disclosure.
Figure 2:
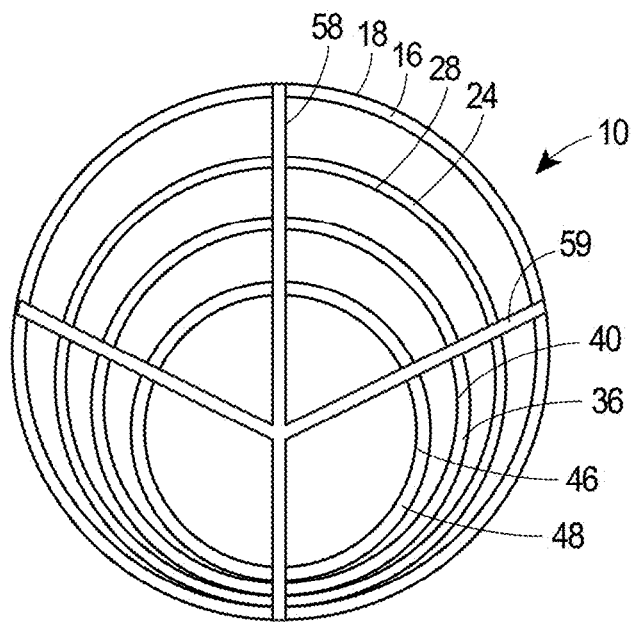
FIG. 2 is an end view of an inlet end of the flow stabilizer taken at B-B of FIG. 1.
Figure 3:
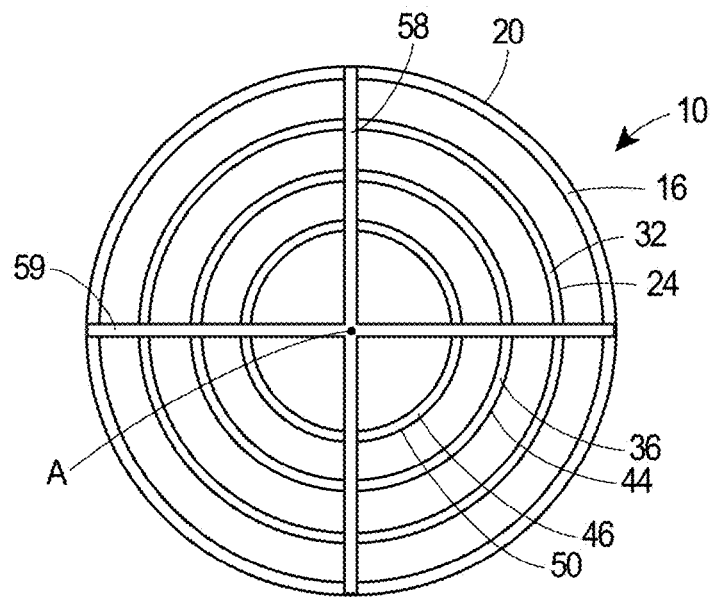
FIG. 3 is an end view of an outlet end of the flow stabilizer taken at C-C of FIG. 1.

In FIG. 1, a flow stabilizer 10, which is disposed in an outlet passage 12 of a control valve 14 (and in this example, a rotary valve 14) according to the present disclosure and generally relates to a device for attenuating the noise of fluid (preferably gas) in non-axisymmetric turbulent flow. The flow stabilizer 10 attenuates the noise of gas in the outlet passage 12 of the control valve 14, and includes a plurality of nested shells disposed in an eccentric arrangement at a first or inlet end 18 of the flow stabilizer 10 as shown in FIG. 2, and in a concentric arrangement at a second or outlet end 20 of the flow stabilizer 10 as shown in FIG. 3. The flow stabilizer 10 extends from the eccentric arrangement to the concentric arrangement along an axis A of a main body or outer shell 16 of the flow stabilizer 10. In the illustrated example, the axis A of the main body 16 (also referred herein as the "main body axis A") is coaxially aligned with the longitudinal axis of the outlet passage 12, but in other examples, the main body axis A may be parallel to or nonparallel to the longitudinal axis of the outlet passage 12. The flow stabilizer 10 is illustrated in the context of converting turbulent flow in the outlet passage 12 of the rotary valve 14, however, in other examples, the flow stabilizer 10 may be disposed in a different type of control valve to attenuate noise through an outlet passage or through a conduit other than the outlet passage of the valve.

As shown in FIGS. 1-4, the flow stabilizer 10 includes a main body or outer shell 16 having an axis A, the first or inlet end 18, and the second or outlet end 20. As used herein, the first or inlet end 18 of the outer shell or main body 16 is also referred to as the first or inlet end 18 of the flow stabilizer 10 (FIG. 2), and the second or outlet end 20 of the outer shell or main body 16 is also referred to as the second or outlet end 20 of the flow stabilizer 10 (FIG. 3). The flow stabilizer 10 includes three nested shells—a first inner shell 24, a second inner shell 36, and a third inner shell 46—at least partially if not entirely disposed (e.g., formed) within the outer shell or main body 16. In other examples, however, the flow stabilizer 10 may not include a main body, or may include more or fewer nested shells. Preferably, the nested shells are perforated along their lengths to provide fluid communication between adjacent nested shells.

Figure 4:
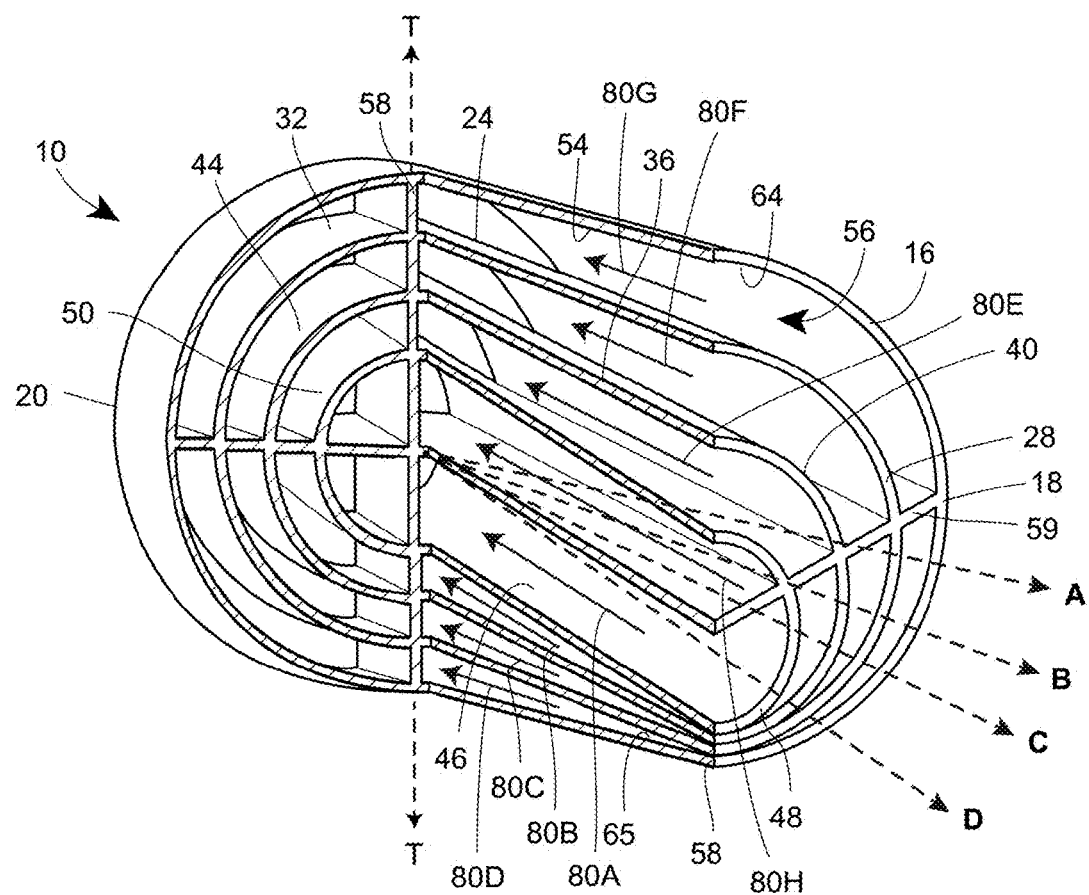
FIG. 4 is a perspective view of the flow stabilizer of FIG. 1, partially cut along two vertical planes.

In FIG. 4, the flow stabilizer 10 is illustrated partially cut along two vertical planes: a plane extending along axis A and a plane extending along an axis T, which is transverse to axis A. The general orientation of the flow stabilizer 10, with respect to at least the location of the inlet end 18 and the outlet end 20, is different than its orientation in FIG. 1. In FIGS. 1-4, the first inner shell 24, which is preferably a metallic shell, is disposed at least partially (if not entirely) within the main body 16 and is centered about, or includes, an axis B (also referred herein as the "first shell axis"), a first or inlet end 28, and a second or outlet end 32. The second inner shell 36, which is also preferably a metallic shell, is disposed at least partially (if not entirely) within the main body 16 and at least partially (if not entirely) within the first shell 24. The second shell 36 is centered about an axis C (also referred herein as the "second shell axis") and includes a first or inlet end 40 and a second or outlet end 44. The third inner shell 46, which is also preferably a metallic shell, is disposed at least partially (if not entirely) within the main body 16 and at least partially (if not entirely) within the second shell 36. The third shell 46 is centered about an axis D (also referred herein as the "third shell axis") and includes a first or inlet end 48 and a second or outlet end 50.

As shown in FIG. 4, each of the first shell 24, the second shell 36, and the third shell 46 has a circular cross-sectional shape taken at any point along the axis A of the main body 16 between the first end 18 and the second end 20 of the flow stabilizer 10, albeit each shell has a differently sized cross-sectional shape (e.g., the cross-sectional shape of the shell 24 is larger than the cross-sectional shape of the shell 36). However, in other examples, the flow stabilizer 10 may have a different cross-sectional shape, such as oblong or elliptical. In these other examples, the cross-sectional shape of each shell 24, 36, and 46 may be the same, as shown in FIG. 4, or the shape of each shell may be different from one another.

In the illustrated example of FIG. 4, the main body 16 has a cylindrical shape and the first, second, and third shells 24, 36, and 46 are entirely disposed within a main body interior area or portion 56 that is enclosed by a cylindrical internal surface 54 of the main body 16. In other examples, however, the main body 16 may have a different shape and/or the first, second, and/or third shells 24, 36, and 46 may only be partially disposed within the main body interior portion 56 or disposed in a different manner. In any case, the first, second, and third shells 24, 36, and 46 are generally disposed within the main body interior portion 56 in an angled or non-parallel configuration. More particularly, as illustrated in FIG. 4, the shells 24, 36, and 46 are disposed so that the first shell axis B is angled relative (i.e., not parallel) to the main body axis A, the second shell axis C is angled relative (i.e., not parallel) to the main body axis A, and the third shell axis D is angled relative (i.e., not parallel) to the main body axis A. In this example, the first shell axis B is oriented at an angle relative to the main body axis A, the second shell axis C is oriented at a different angle relative to the main body axis A, and the third shell axis D is oriented at a different angle relative to the main body A. The angled orientation of each shell depends on the diameter of that particular shell and the length of the flow stabilizer 10 (i.e. distance from the inlet end 18 to the outlet end 20). Thus, in this example, the shell axes B, C, and D are angled relative to one another so that the second shell axis C is also angled relative (i.e., not parallel) to the first shell axis B, and the third shell axis D is also angled relative (i.e., not parallel) to the second shell axis C. In other examples, however, two or more of the first shell axis B, the second shell axis C, and the third shell axis D may be oriented parallel to one another. Further, in other examples, one or two (but not all three) of the first shell axis B, the second shell axis C, and the third shell axis D may be oriented parallel to the main body axis A.

As a result, and as best shown in FIG. 2, the inlet end 18 of the flow stabilizer 10 has an eccentric arrangement (the shells 24, 36, and 46 are eccentrically mounted within the main body 16 and one another at the inlet end 18), and as best shown in FIG. 3 the outlet end 20 of the flow stabilizer 10 has a concentric arrangement (the shells 24, 36, and 46 are concentrically mounted within the main body 16 and one another at the outlet end 20). Thus, when the inlet end 18 is arranged in the outlet passage 12 of the rotary valve 14, as shown in FIG. 1, the flow stabilizer 10 receives a non-axisymmetric fluid flow at the eccentrically arranged inlet end 18, guides the fluid flow through a plurality of flow paths 80A-H of the flow stabilizer 10, and delivers the flow through the concentrically arranged outlet end 20. In other words, each shell 24, 36, and 46 is configured to transition from the eccentric arrangement at the first end 18 of the main body 16 to the concentric arrangement at the second end 20 of the main body 16, thereby converting the fluid flow.

As shown in FIG. 4, the non-parallel configuration of the shells 24, 36, and 46 (relative to the main body 16) define a plurality of flow paths 80A, 80B, 80O, 80D, 80E, 80F, 80G, and 80H, where each flow path 80A-80H slopes relative to the longitudinal, main body axis A as the flow stabilizer 10 extends from the inlet end 18 to the outlet end 20. Each shell 24, 36, and 46 extending along its respective axis B, C, and D defines at least one linear flow path 80A-80H with the adjacent shell 24, 36, and 46. The flow paths 80A-80H of the illustrated flow stabilizer 10 slope in a substantially linear manner relative to the main body axis A from a lower, inner surface 65 of the main body 16 toward an upper, inner surface 64 of the main body 16. The flow paths 80A-80H slope as the flow stabilizer 10 transitions from the eccentric arrangement at the first or inlet end 18 to the concentric arrangement at the second or outlet end 20. In other words, incoming or upstream flow entering the flow paths 80A-80H at the inlet 18 of the flow stabilizer 10 is different from outgoing or downstream flow exiting the flow paths 80A-80 at the outlet 20 of the flow stabilizer 10.

Specifically, and as illustrated in FIG. 4, a first flow path 80D, which may be separated from or combined with an upper flow path 80G, is at least partially defined by the main body 16 and the first shell 24. A second flow path 80C, which may be separated from or combined with an upper flow path 80F, is at least partially defined by the first shell 24 and the second shell 36. A third flow path 80B, which may be separated from or combined with an upper flow path 80E, is at least partially defined by the second shell 36 and the third shell 46. A fourth flow path 80A, which may be separated from or combined with an upper flow path 80H is at least partially defined by an interior surface of the third shell 46. As shown in FIGS. 2-4, the flow paths 80D, 80C, 80B, and 80A are separate from their respective upper flow paths 80G, 80F, 80E, and 80H by a first brace 58 and a second brace 59, which will be described in more detail below.

As shown in FIG. 4, the flow paths 80A-80H slope relative to the main body axis A from the lower, inner surface 65 of the main body 16 toward the upper, inner surface 64 of the main body 16, such that the shells 24, 36, and 46 are spaced closer to one another at or adjacent the upper, inner surface 64 than at or adjacent the lower, inner surface 65 at the inlet end 18. This sloped transition from eccentric to concentric arrangements helps reduce noise and vibration associated with control valves by reducing the level of turbulence entering the outlet passage 12 as well as eliminating direct excitation of the passage 12 by the non-axisymmetric flow discharging from the rotary valve 14. In another example, the shells 24, 36, and 46 are nested in and in contact with one another at the lower, inner surface 65 of the main body 16. More particularly, and best shown in FIG. 2, an outer surface of the first shell 24 is in line contact with an internal surface of the main body 16. Likewise, an outer surface of the second shell 36 is in line contact with an inner surface of the first shell 24, an outer surface of the third shell 46 is in line contact with an inner surface of the second shell 36, and so on.

The flow stabilizer 10 includes a plurality of braces that separate or further define the plurality of flow paths 80A-H, beneficially provide structural support (e.g., rigidify, strengthen), and help maintain the orientation of the shells 24, 36, and 46 relative to the main body 16. In this example, the flow stabilizer 10 includes a generally vertically extending brace 58 and a generally horizontally extending brace 59. The generally vertically extending brace 58 connects the shells 24, 36, and 46 to the main body 16 (and one another) along or in the generally vertical direction, while the generally horizontally extending brace 59, which is non-parallel (and in some cases perpendicular) to the brace 58, connects the shells 24, 36, and 46 to the main body 16 (and one another) along or in the generally horizontal direction, relative to the orientation shown in the figures. The braces 58 and 59 may be integrally formed with the main body 16 and the first, second, and third shells 24, 36, and 46 during manufacturing. Alternatively, the braces 58 and 59 (as well as any other braces) may be separately formed and then welded or otherwise secured to the main body 16 and the first, second, and third shells 24, 36, and 46. In other examples, the flow stabilizer 10 can include greater, fewer, and/or different braces. As an example, the brace 58 and/or the brace 59 may be formed of a plurality of smaller, interconnected braces or brace segments.

As shown in FIG. 3, the shells 24, 36, and 46 are evenly spaced apart from one another in the concentric arrangement, however in other examples, the cross-sectional diameter of one or more shells 24, 36, and 46 may be increased or decreased to minimize or maximize the space between surrounding adjacent shells. In any event, the flow stabilizer 10 allows eccentricity at the inlet end 18 to be maximized while maintaining consistency with design for mechanical strength to withstand high forces involved in many applications. The concentric outlet 20 provides for a preferred fluid flow outlet path. The flow stabilizer 10 reduces the distance required for pipe flow to transition from eccentric to concentric flow.

Figure 5:
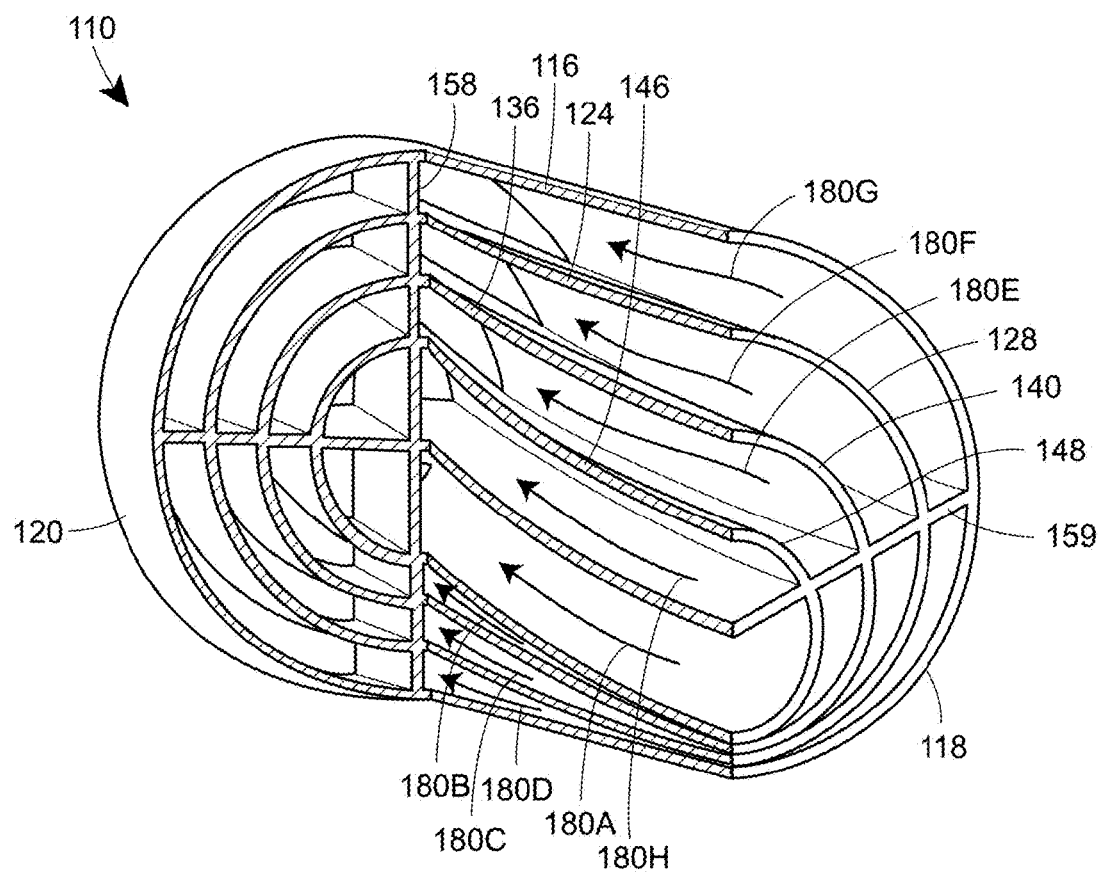
FIG. 5 is a perspective view of a second example of a flow stabilizer constructed according to the teachings of the present disclosure, partially cut along two vertical planes.

In FIG. 5, another example of a flow stabilizer 110 constructed in accordance with the teachings of the present disclosure is provided. For ease of reference, and to the extent possible, the same or similar components will retain the same reference numbers as outlined above with respect to the flow stabilizer 10 discussed above, although the reference numbers will be increased by 100. The flow stabilizer 110 is similar to the flow stabilizer 10 described above in many respects, and may be used in a control valve 14 (such as the control valve 14 of FIG. 1) in the same arrangement as the flow stabilizer 10. However, unlike the flow stabilizer 10, which has a plurality of flow paths that slope in a substantially linear manner, the flow stabilizer 110 define a plurality of flow paths 180A-180H that are curved as the flow stabilizer 110 extends from an inlet end 118 to an outlet end 120. Each shell 124, 136, and 146 extending along its respective axis defines at least one curved flow path 180A-180H with the adjacent shell 124, 136, and 146. The flow paths 180A-180H of the illustrated flow stabilizer 110 slope in a curved manner relative to the main body axis from a lower, inner surface 165 of a main body 116 toward an upper, inner surface 164 of the main body 116. The flow paths 180A-180H slope as the flow stabilizer 110 transitions from the eccentric arrangement at the first or inlet end 118 to the concentric arrangement at the second or outlet end 120.

Figure 6:
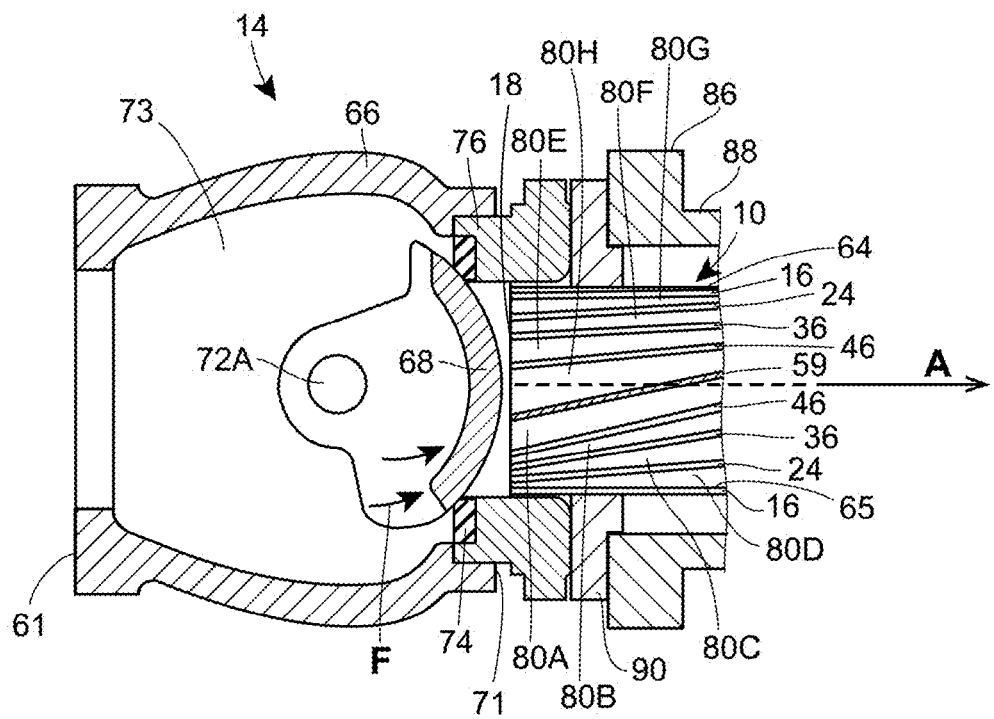
FIG. 6 is a cross-sectional view of the control valve of FIG. 1, showing a valve plug of the control valve in a closed position.
Figure 7:
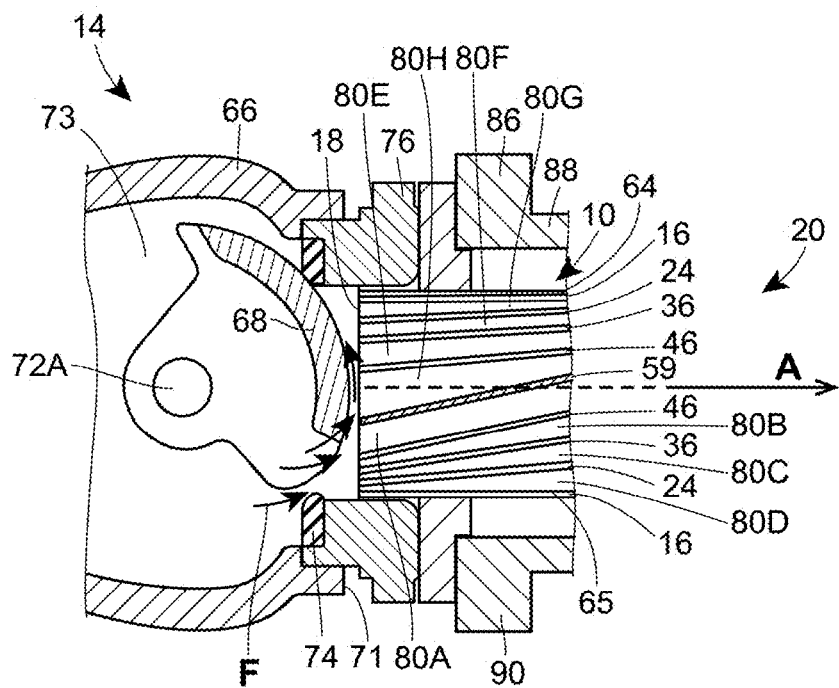
FIG. 7 is a cross-sectional view of the control valve of FIG. 1, showing the valve plug in a partially open position.

Turning now to FIGS. 6 and 7, the fluid stabilizer 10 is disposed in the rotary valve 14 of FIG. 1, and is depicted from a top view relative to the orientation of the rotary valve 14 shown in FIG. 1. The rotary valve 14 of FIGS. 1, 6, and 7 includes, in relevant part, a valve body 66 having a chamber 73, an upstream face surface 61, a downstream face surface 71, and a non-axisymmetric opening valve plug or control member 68 operated by stub shafts 72A and 72B journaled in the valve body 66. The rotary valve 14 includes a seal 74 held in place by a seal ring 76. The seal ring 76 is retained on the valve body 66 by suitable fasteners 78, such as, for example, through bolts, cap screws, or other suitable means. The rotary valve 14 is positioned between a first flange 82 of a conduit (e.g., pipe) 84 and a second flange 86 of a conduit (e.g., pipe) 88. In this example, the rotary valve 14 is clamped between the flanges 82 and 86 using fasteners 78. The fasteners 78, which are spaced circumferentially about the rotary valve 14, can also clamp the flow stabilizer 10 in place. In preferred examples, the flow stabilizer 10 includes an annular flange 90 that is secured to an outermost surface of the main body 16 and, so positioned, can be clamped between the rotary valve 14 and the flange 86 via fasteners 78.

Normally, the rotary valve 14 would be installed such that the outer surface of the plug 68 faces upstream (left in FIG. 1) when it is in the closed position. While the rotary valve 14 may be installed in such manner, the rotary valve 14 is preferably installed in a reverse flow configuration, i.e., so that the outer surface of the rotary valve plug 68 faces downstream (right in FIG. 1) when it is in the closed position. In either case, the flow stabilizer 10 described herein is arranged immediately downstream of the non-axisymmetric opening valve plug 68 so as to render the flow substantially axisymmetric and to attenuate the noise of fluid in turbulent flow. Moreover, in the illustrated example, the lower, inner surface 65 of the flow stabilizer 10 is arranged to receive fluid flow before the upper, inner surface 64 when the valve plug 68 is opened, as illustrated in FIG. 7.

When the rotary valve plug 68 is closed, as shown in FIG. 6, for example, fluid flow F will abut the inner surface of the rotary valve plug 68. As shown in FIG. 7, as the valve plug 68 opens to permit non-axisymmetric flow from the valve body 66, fluid will pass through the bore in the seal ring 76 and enter the flow paths 80A-H formed by the main body 16 and the shells 24, 36, and 46 at the lower, inner surface 65 of the flow stabilizer. Eventually, the fluid will substantially fill each shell 24, 36, and 46 (and each of the flow paths 80A-80H) from the lower, inner surface 65 to the upper, inner surface 64 of the flow stabilizer 10, entering the smallest shell 46 first, so that by the time the fluid exits the flow stabilizer 10, the main body 16 and the shells 24, 36, and 46 are substantially filled, and the fluid is converted to fully developed pipe flow (i.e., substantially axisymmetric flow). The noise of the fluid will be attenuated as the fluid spreads radially and passes through other shells 24, 36, and 46 as it flows axially from the inlet end 18 to the outlet end 20 of the flow stabilizer 10. The smooth transition to axisymmetric flow in the conduit 88 downstream of the rotary valve 14 is at a reduced level of turbulence and thus, noise and system vibration are minimized for both gas and liquid systems. High velocity jets in the conduit 88 downstream of the rotary valve 14 are eliminated. The pressure gradient of the gas in adjacent shells is reduced, helping to reduce the turbulence of the fluid and hence, the noise and vibration caused in the downstream conduit 88.

The flow stabilizer 10 can be installed in a different manner and yet still operate as intended. As an example, the flow stabilizer 10 can be mounted in a vertical pipe or at an angle. However, it is highly preferable that the flow stabilizer 10 be installed so that its smallest shell, in this example the third shell 46, is aligned with the initial opening of the rotary valve 14 or the source of non-axisymmetric flow, so that initial flow from the opening is directed into the smallest shell 46. The orientation of the flow stabilizer 10 relative to the valve plug 68 has been found to produce optimal results.

Figure 8:
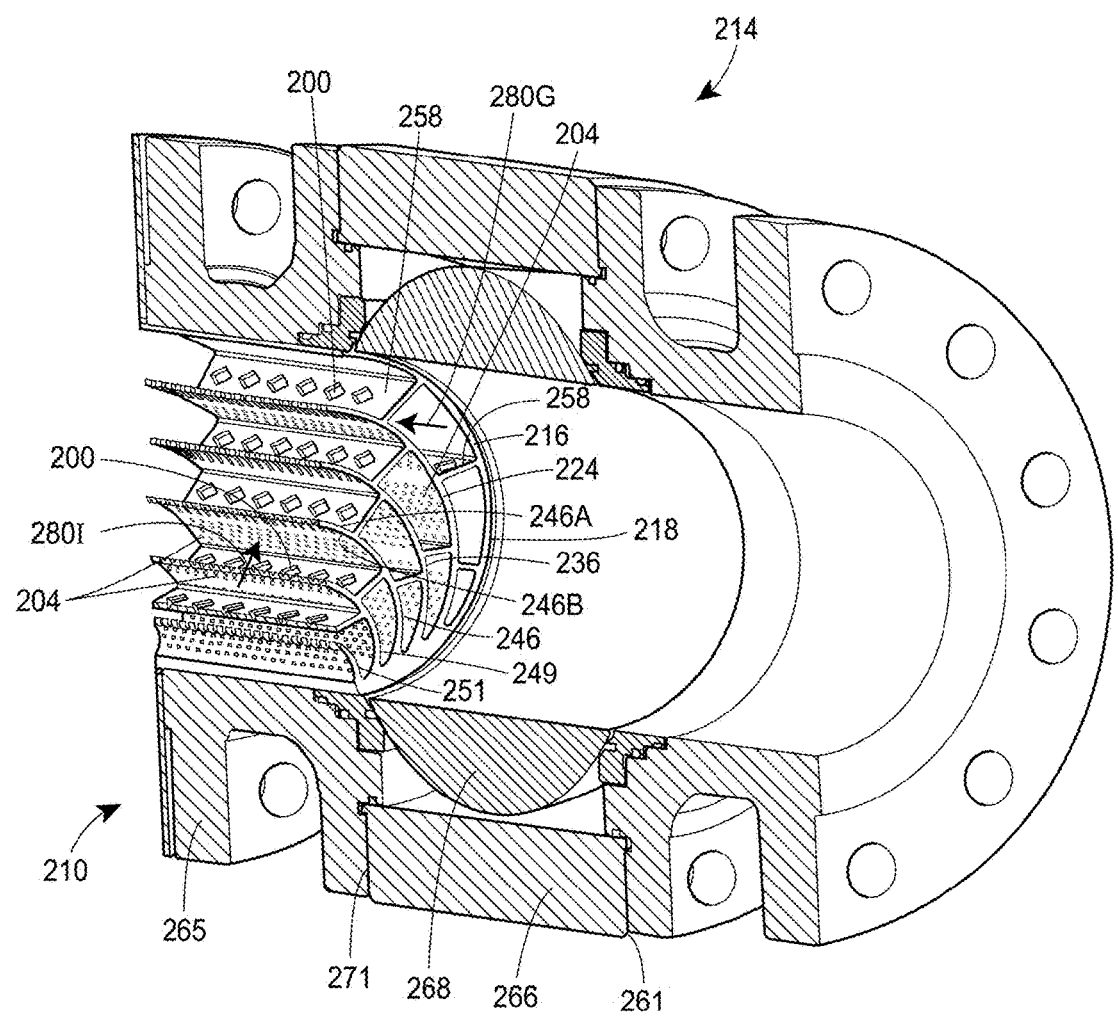
FIG. 8 is a perspective cross-sectional view of a third example of a flow stabilizer constructed according to the teachings of the present disclosure.

The walls of each of the shells and the walls of braces are perforated (as opposed to being solid), as best shown in another example of a flow stabilizer 210 constructed in accordance with the teachings of the present disclosure and depicted in FIG. 8. The flow stabilizer 210 is disposed adjacent to a downstream surface face 271 of a valve body 266 and interior to a tailpiece 265 being immediately adjacent to a source of non-axisymmetric flow, for example a sharp turn or a rotary valve 214 (e.g., the rotary valve 14 of FIG. 1), formed by the flow path of a control member 268. For ease of reference, and to the extent possible, the same or similar components will retain the same reference numbers as outlined above with respect to the flow stabilizer 10 discussed above, although the reference numbers will be increased by 200.

As illustrated, the flow stabilizer 210 may include five shells 224, 236, 246, 249, and 251, and a plurality of braces 258 disposed between the shells 224, 236, 246, 249, and 251. Each of the shells 224, 236, 246, 249, and 251 is perforated, i.e., has apertures 204 formed therein. As an example, apertures 204 formed in the shell 246 fluidly connects an inner surface 246B and an outer surface 246A of the shell 246. Likewise, each of the braces 258 is perforated, i.e., has apertures 200 formed therein that fluidly connect two flow paths separated by the brace 258. The apertures 200 and 204 may be uniform or varied and/or may be a variety of shapes (e.g., circular, triangular, diamond) and sizes. As an example, the apertures 200 and 204 may be about ⅛ inch in diameter and up to ¼ inch in diameter for silencers where the diameter of the largest shell is approximately 18 inches. In tests to date, best results have been obtained with ⅛ inch diameter apertures 200, 204 and where the total open area is about forty percent (40%) of the outer surface area of a shell. For larger silencers, e.g., those having an approximately 24 inch outside diameter, thicker metal would be used for the shells and larger apertures 200, 204, e.g., apertures having a diameter of ⅜ inch or even ½ inch, would be needed.

As illustrated, the flow stabilizer 210 includes a plurality of flow paths 280 that extend between a first end 218 and a second end 220, and the apertures 200 and 204 fluidly connect adjacent flow paths 280. For example, a first flow path 280G is at least partially defined by the main body 216, the first shell 224, and two different braces 258 disposed between the main body 216 and the first shell 224. A second, different flow path 280I is at least partially defined by the third shell 246 and the fourth shell 249. The flow path 280I is fluidly connected to adjacent flow paths 280 by way of apertures 204 in the third shell 246 and fourth shell 249, as well as apertures 200 in the brace 258.

Moreover, it will be appreciated that the location of the braces 258 relative to the shells 224, 236, 246, 249, and 251 may or may not be evenly dispersed to obtain a desired flow path between the shells. Additionally, the braces 258 are angled (or non-parallel) relative to each other, as illustrated in FIG. 8, though in other examples, the braces may be parallel 258, such as different brace segments of the brace 58 of FIGS. 2-4.

Figure 9:
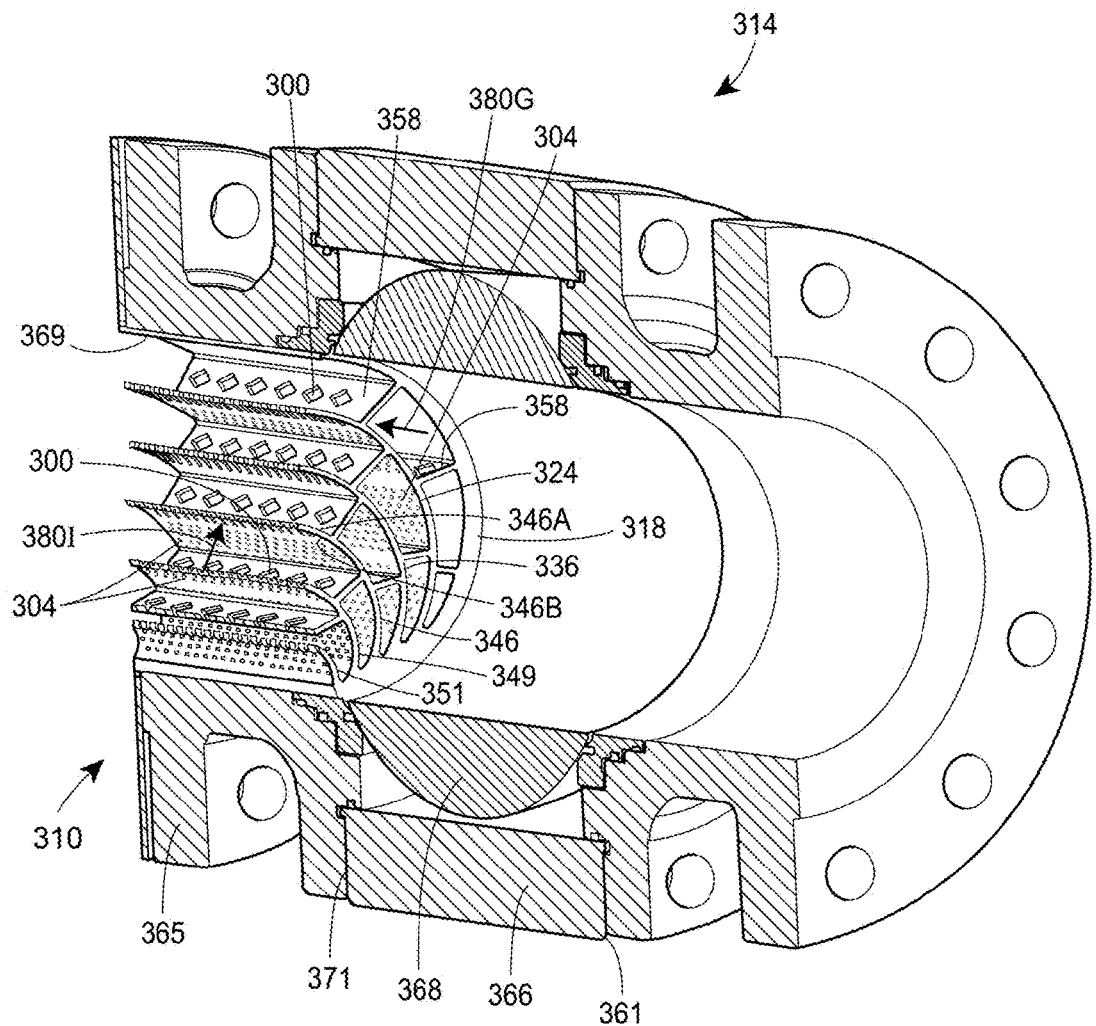
FIG. 9 is a perspective cross-sectional view of a fourth example of a flow stabilizer constructed according to the teachings of the present disclosure.

Turning now to FIG. 9, another example of a flow stabilizer 310 constructed in accordance with the teachings of the present disclosure is provided. The flow stabilizer 310 operates in a similar manner as the flow stabilizers 10, 110, and 210 described above, but unlike the flow stabilizers 10, 110, and 210, the flow stabilizer 310 does not include a main body. For ease of reference, and to the extent possible, the same or similar components will retain the same reference numbers as outlined above with respect to the flow stabilizer 10 and rotary valve 14 discussed above, although the reference numbers will be increased by 200.

In FIG. 9, the flow stabilizer 310 includes a plurality of braces 358 that may be directly connected to an interior wall 369 of a tailpiece 365 of a rotary valve 314 through welding or other means known in the art. Further, the flow stabilizer 310 may be directly formed and integral to the tailpiece 365 via additive manufacturing described in additional detail below.

In accordance with the teachings of the present disclosure, the shells should preferably have a characteristic length of at least 1.2 times the characteristic inlet bore dimension of a base (such as the base of seal ring 76 in FIG. 1) containing the source of the non-axisymmetric flow. Best results are expected when the shells have a characteristic length of from 1.5 to 4 times the characteristic inlet bore dimension of the base. Normally, the seal ring 76 and the conduit 88 have the same cross-sectional configuration and the seal ring 76 has the same or a smaller diameter than the conduit 88.

Further, while the flow stabilizers 10, 110, 210, and 310 are described in connection with the rotary valve 14, it will be understood that any of the flow stabilizers of the present disclosure can be used with other control valves and preferably other rotary valves, such as, for example, a segmented ball valve or a butterfly valve. For a butterfly valve, the flow stabilizer 10, 110, 210, or 310 may, for example, be adapted to include two eccentric inlet ends and one concentric outlet end.

The flow stabilizers 10, 110, 210, and 310 of the present disclosure are manufactured to effectively reduce turbulent flow downstream of a non-axisymmetric discharging valve and convert the non-axisymmetric flow to substantially axisymmetric flow, i.e., fully developed pipe flow. Additionally, the flow stabilizers 10, 110, 210, and 310 of the present disclosure are easier and less costly to manufacture than conventional flow stabilizers.

More specifically, the flow stabilizers 10, 110, 210, and 310 may be manufactured using additive manufacturing techniques. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

While various embodiments have been described above, this disclosure is not intended to be limited thereto. Variations can be made to the disclosed embodiments that are still within the scope of the appended claims.

What is claimed is:

1. A control valve comprising:
   a valve body including a generally axial fluid flow path extending from an upstream face surface to a downstream face surface of the valve body, the valve body having a chamber and a control member disposed within the chamber to control fluid flow through the valve body; and
   a flow stabilizer disposed adjacent to the downstream face surface of the valve body, the flow stabilizer including plurality of nested shells and including:

an outer shell having an outer shell axis, a first end, and a second end; and a first inner shell disposed at least partially within the outer shell, the first inner shell having an axis, a first end, and a second end, and wherein the axis of the first inner shell is angled relative to the axis of the outer shell.

2. The control valve of claim 1, wherein the flow stabilizer further includes a second inner shell disposed at least partially within the outer shell and at least partially within the first inner shell, the second inner shell having an axis, a first end, and a second end, wherein the axis of the second inner shell is angled relative to the axis of the outer shell.

3. The control valve of claim 2, wherein the flow stabilizer further includes a third inner shell disposed at least partially within the outer shell and at least partially within the second inner shell, the third inner shell having an axis, a first end, and a second end, wherein the axis of the third inner shell is angled relative to the axis of the outer shell.

4. The control valve of claim 1, wherein the outer shell includes a tailpiece.

5. A flow stabilizer adapted to be disposed in an outlet passage of a control valve, the flow stabilizer comprising:

a main body having a main body axis, a first end, and a second end;

a first shell disposed at least partially within the main body, the first shell having an axis, a first end, and a second end;

a second shell disposed at least partially within the main body and at least partially within the first shell;

wherein the axis of the first shell is angled relative to the axis of the main body.

6. The flow stabilizer of claim 5, wherein the second shell has an axis, a first end, and a second end, wherein the axis of the second shell is angled relative to the axis of the main body.

7. The flow stabilizer of claim 6, further comprising a third shell disposed at least partially within the main body and at least partially within the second shell, the third shell having an axis, a first end, and a second end, wherein the axis of the third shell is angled relative to the axis of the main body.

8. The flow stabilizer of claim 7, wherein the main body has a cylindrical internal surface that defines a main body interior portion, the first shell, the second shell, and the third shell disposed at least partially within the interior portion of the main body.

9. The flow stabilizer of claim 6, wherein a cross-sectional shape of the first shell is circular from the first end of the first shell to the second end of the first shell, and wherein a cross-sectional shape of the second shell is circular from the first end of the second shell to the second end of the second shell.

10. The flow stabilizer of claim 6, wherein the first shell extending along the axis of the first shell and the second shell extending along the axis of the second shell define at least one linear flow path, and wherein the at least one linear flow path slopes relative to the axis of the main body from a lower inner surface of the main body toward an upper inner surface of the main body.

11. The flow stabilizer of claim 6, wherein the first shell extending along the axis of the first shell and the second shell extending along the axis of the second shell define at least one curved flow path, and wherein the at least one curved flow path slopes relative to the axis of the main body from a lower inner surface of the main body toward an upper inner surface of the main body.

12. The flow stabilizer of claim 6, further comprising a plurality of flow paths extending between the first end of the main body and the second end of the main body.

13. The flow stabilizer of claim 12, wherein a first path of the plurality of flow paths is at least partially defined by the main body and the first shell, and a second path of the plurality of flow paths is at least partially defined by the first shell and the second shell.

14. The flow stabilizer of claim 12, further comprising a plurality of braces separating the plurality of flow paths, wherein a first brace of the plurality of braces connects the main body and the first shell and a second brace of the plurality of braces connects the first shell and the second shell, wherein the plurality of braces extend between the first end of the main body and the second end of the main body.

15. The flow stabilizer of claim 14, wherein at least one of the plurality of braces is perforated.

16. A flow stabilizer adapted to be disposed in an outlet passage of a control valve, the flow stabilizer comprising:

a main body extending having an axis, a first end, and a second end;

a first shell disposed at least partially within the main body, the first shell having an axis, a first end, and a second end; and a second shell disposed at least partially within the main body and at least partially within the first shell, the second shell having an axis, a first end, and a second end;

a first brace integrally formed with the main body and the first shell;

a second brace integrally formed with the first shell and the second shell;

wherein a cross-sectional shape of the first shell is circular from the first end of the first shell to the second end of the first shell, wherein a cross-sectional shape of the second shell is circular from the first end of the second shell to the second end of the second shell.

17. The flow stabilizer of claim 16, wherein the first shell and the second shell are concentrically aligned with one another at the first end of the first shell and at the first end of the second shell, and wherein the first shell and second shell are eccentrically aligned with one another at the second end of the first shell and the second end of the second shell.

18. The flow stabilizer of claim 16, wherein the axis of the first shell is angled relative to the axis of the main body, and the axis of the second shell is angled relative to the axis of the main body and the axis of the first shell.

19. The flow stabilizer of claim 16, wherein the first brace and the second brace are parallel.

20. The flow stabilizer of claim 16, wherein the first brace and the second brace are angled relative to one another.

* * * * *

UNITED STATES PATENT AND TRADEMARK OFFICE
CERTIFICATE OF CORRECTION

PATENT NO. : 10,495,234 B2  
APPLICATION NO. : 15/717833  
DATED : December 3, 2019  
INVENTOR(S) : Allen C. Fagerlund et al.

Page 1 of 1

It is certified that error appears in the above-identified patent and that said Letters Patent is hereby corrected as shown below:

In the Specification

At Column 5, Line 63, "800," should be -- 80C, --.

At Column 6, Line 12, "80A-80" should be -- 80A-80C --.

At Column 9, Line 35, "flow path 2801" should be -- flow path 280I --.

At Column 9, Line 36, "flow path 2801" should be -- flow path 280I --.

Signed and Sealed this  
Twenty-second Day of December, 2020

Andrei Iancu  
*Director of the United States Patent and Trademark Office*